(12) United States Patent
Monte et al.

(10) Patent No.: US 9,294,187 B2
(45) Date of Patent: Mar. 22, 2016

(54) METHOD FOR FREQUENCY CHANNEL SELECTION IN A SATELLITE COMMUNICATION SYSTEM

(71) Applicant: GLOBALSTAR, INC., Milpitas, CA (US)

(72) Inventors: Paul A. Monte, San Jose, CA (US); Vijaya Gallagher, San Jose, CA (US); Brinda T. Shah, Cupertino, CA (US)

(73) Assignee: Globalstar, Inc., Covington, LA (US)

( * ) Notice: Subject to any disclaimer, the term of this patent is extended or adjusted under 35 U.S.C. 154(b) by 0 days.

(21) Appl. No.: 13/886,969

(22) Filed: May 3, 2013

(65) Prior Publication Data

US 2013/0281010 A1    Oct. 24, 2013

Related U.S. Application Data

(62) Division of application No. 11/446,992, filed on Jun. 5, 2006, now Pat. No. 8,463,178.

(51) Int. Cl.
*H04B 7/185* (2006.01)
*H04B 7/19* (2006.01)

(52) U.S. Cl.
CPC ........ *H04B 7/18513* (2013.01); *H04B 7/18563* (2013.01); *H04B 7/19* (2013.01)

(58) Field of Classification Search
USPC ........................................ 455/42.1, 13.5, 427
See application file for complete search history.

(56) References Cited

U.S. PATENT DOCUMENTS

| | | | |
|---|---|---|---|
| 5,303,286 A | 4/1994 | Wiedeman | |
| 5,490,087 A | 2/1996 | Redden et al. | |
| 5,715,297 A | 2/1998 | Wiedeman | |
| 5,737,705 A | 4/1998 | Ruppel et al. | |
| 5,875,180 A | 2/1999 | Wiedeman et al. | |
| 5,903,837 A | 5/1999 | Wiedeman | |
| 5,905,943 A | 5/1999 | Wiedeman et al. | |
| 5,918,176 A | 6/1999 | Arrington, Jr. et al. | |
| 5,937,332 A | 8/1999 | Karabinis | |
| 6,052,586 A | 4/2000 | Karabinis | |
| 6,072,768 A | 6/2000 | Wiedeman et al. | |
| 6,253,086 B1 | 6/2001 | Parantainen et al. | |
| 6,272,325 B1 | 8/2001 | Wiedeman et al. | |
| 6,684,057 B2 * | 1/2004 | Karabinis | ..... 455/12.1 |
| 6,735,440 B2 | 5/2004 | Wiedeman et al. | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 2006/0094352 A1 * | 5/2006 | Karabinis | ..... 455/13.4 |
| 2010/0009677 A1 | 1/2010 | Karabinis et al. | |

FOREIGN PATENT DOCUMENTS

GB    2306855 A    7/1997

\* cited by examiner

*Primary Examiner* — David Q Nguyen
(74) *Attorney, Agent, or Firm* — Jones Walker LLP

(57) ABSTRACT

A communications system comprising a first transceiver and a second transceiver, which system employs a device that measures power over a frequency band from sources other than those monitoring downlink radiation received at a radio terminal from the satellite, and a controller that receives these power measurements to determine on which frequency channel within a band a transmitter is to transmit.

15 Claims, 4 Drawing Sheets

METHOD FOR FREQUENCY CHANNEL SELECTION IN A SATELLITE COMMUNICATION SYSTEM

CROSS REFERENCE TO RELATED APPLICATIONS

This application is a divisional of U.S. application Ser. No. 11/446,992, now allowed, filed 5 Jun. 2006, the disclosure of which is incorporated herein by reference in its entirety.

BACKGROUND

Field

The present invention relates to satellite radio telephone systems and methods. More specifically, the present invention relates to mobile satellite systems employing an augmented terrestrial component.

It is known that satellite radio telephones have been developed and deployed throughout the world, especially where topographical conditions preclude use of conventional mobile radio telephones or fixed wire telephones, for example in rugged terrain areas or sparsely populated areas. These systems typically are understood to provide both voice and data communications so that they may include terminals such as PCS terminals.

Prior art satellite radio telephone systems may be broadly classified into two types: mobile satellite radio telephone systems and fixed satellite radio telephone systems. In each of these systems one or more satellites are used to communicate with radio telephones, the satellites being either orbiting satellites or geostationary satellites. Typically, a mobile satellite radio telephone system is designed to communicate with a plurality of mobile radio telephones of similar size as conventional cellular radio telephones, whereas a fixed satellite radio telephone system is designed to communicate with a plurality of fixed or non-mobile radio telephones using permanent or semi-permanent fixed antennas which may be mounted on buildings or homes.

Consequently, it is found the capacity of fixed satellite radio telephone systems is much larger than that associated with mobile satellite radio telephone systems where a significantly lower number of radio telephones are served than in a fixed satellite system.

Generally, the per-satellite capacity of a satellite radio telephone is limited by the amount of satellite power that is expended per communication circuit in order to establish and maintain communications with a radio telephone. In addition, limiting factors such as available frequency spectrum and the typically poor frequency reuse of satellite radio telephone systems impact the per-satellite capacity of these phones.

Consequently, mobile satellite radio telephone systems have been found to generally possess much lower capacity than fixed satellite radio telephone systems. Both regional and global mobile satellite systems are found to be quite limited in capacity, the regional mobile satellite systems involving geostationary satellites having, for example, a capacity per satellite of about 10,000 simultaneous radio telephone communications, whereas global mobile satellite systems involving both medium earth orbiting satellites, or MEOs, or low earth orbiting satellites, or LEOs, generally have even lower capacity per satellite ranging into the 3,000-4,000 simultaneous radio telephone communications.

It is understood that the per-satellite capacity of mobile satellite radio telephone systems is the amount of power that is expended per communication by the satellite payload in order to establish and maintain communications with the small hand held mobile phones. The practical limitations involved in forming a very large number of spot beams from the satellite often limits frequency reuse for mobile satellite radio telephone systems resulting in generally low capacities of said systems.

Prior art mobile satellite systems employing radio telephones or MSS are known in the art; for example, in U.S. Pat. No. 5,303,286 to Globalstar® a satellite communication system having at least one, but usually a plurality, of orbiting satellites over a terrestrial satellite service area, a satellite control center and a plurality of terrestrial communication links wherein call setup is controlled by processors and databases onboard the orbiting satellites and where only after the satellite link for the communication channels is completed, does control and switching rely on ground based systems such that the orbiting satellites are integrated into a ground based telephone network and tariff structure.

In U.S. Pat. No. 5,715,297 to Globalstar® there is disclosed a radio communication system capable of servicing a roaming user or the like outside the range of terrestrial relay stations which includes a packet switched network and database of roaming users and a satellite communications system having at least one, but usually a plurality, of orbiting satellites over a terrestrial satellite service area, a satellite control center and a plurality of terrestrial communication links, wherein call setup is controlled by processors and databases onboard the orbiting satellites and wherein only after the satellite link for the communication channels is completed, does control and switching rely on ground based equipment such that the orbiting satellites are integrated to a ground based telephone network and tariff structures. Similar systems and improvements thereto, as found in the U.S. Pat. Nos. 5,303,286 and 5,715,297 patents, include those defined in U.S. Pat. No. 5,903,837 and U.S. Pat. No. 6,072,768.

Various other systems have been proposed as depicted in the FCC filing for "Authority to Launch and Operate a Satellite System to Provide Mobile Satellite Services in the 2 GHz Bands" dated Nov. 3, 2000, relating to the Globalstar® system, which is hereby incorporated by reference; the FCC filing in the matter of Mobile Satellite Ventures Subsidiary, LLC for "Minor Amendment of Application to Launch and Operate a Replacement L Band Mobile Service Satellite at 101° West" dated Nov. 18, 2003; and the FCC filing by Thoraya which depicts a one GEO satellite system to provide a satellite telephone service; and the Iridium system produced by Motorola generally described in U.S. Pat. Nos. 5,918,176 and 5,490,087, in addition to the above recited Globalstar® systems.

Prior art methods to increase the relatively limited capacity of mobile satellite radio telephone systems experiencing capacity bottlenecks or hot spots which are developed in congested areas of the mobile satellite radio telephone system where the mobile satellite radio telephone system (MSS) does not have enough capacity to accommodate all users, so that it is difficult to increase the capacity of the MSS in these congested areas.

Consequently, methods and systems to increase the capacity of MSS include allowing an MSS to use some of the capacity of a fixed satellite system in areas of congestion, such as defined in U.S. Pat. No. 6,052,586.

In addition to improving cellular satellite communication systems and methods to provide wireless communications employing at least one space based component such as one or more satellites that are configured to wirelessly communicate with a plurality of radio telephones or other types of cellular terminals, hybrids of satellite and terrestrial systems have been developed and used wherein terrestrial networks enhance cellular satellite communications system availability, efficiency and/or economic viability by terrestrially reusing at least some of the frequency bands allocated to cellular satellite communication systems. Difficulty is experienced for cellular satellite communication systems to reliably serve densely populated areas where the satellite signal may be blocked by high rise structures or may not penetrate into buildings. In such cases, the satellite spectrum may be underutilized or unutilized in such areas. It is found that the use of terrestrial retransmission can reduce or eliminate this problem. Thus, the capacity of the overall system can be increased significantly by the introduction of terrestrial retransmission since terrestrial frequency reuse can be much denser than that of a satellite-only system. It is further found that capacity can be enhanced where it may be mostly needed, for example, densely populated urban/industrial/commercial areas so that the overall system can become much more economically viable as it is seen to be able to serve a much larger subscriber base.

One example in the prior art of terrestrial reuse of satellite frequencies is described in U.S. Pat. No. 5,937,332 entitled "Satellite Telecommunications Repeaters and Retransmission Methods". Generally described therein, satellite communication repeaters are provided which receive, amplify and locally retransmit the downlink signal received from a satellite, thereby increasing the effect of downlink margin in the vicinity of the satellite telecommunications repeaters and allowing an increase in the penetration of uplink and downlink signals into buildings, foliage, transportation vehicles and other objects which can reduce link and margin.

Methods and systems in the prior art allow a satellite radio telephone frequency to be reused terrestrially within the same satellite cell while allowing intrasystem interference to be reduced. These systems include a space based component such as a satellite that is configured to receive wireless communications from a first radio telephone in a satellite footprint comprising one or more cells over a satellite radio telephone frequency band. There is also provided an ancillary terrestrial network comprising one or more ancillary terrestrial components configured to receive wireless communications from a second radio telephone in the satellite footprint over the satellite radio telephone frequency band. The wireless communications from the second radio telephone are also received by the space based component in the satellite footprint over the satellite radio telephone frequency band as interference, along with the wireless communications that are received from the first radio telephone in the satellite footprint over the satellite radio telephone frequency band. In such cases, an interference reducer is employed that is responsive to the space based component and to the ancillary terrestrial network and that is configured to reduce the interference from the wireless communications that are received by the space based component from the first radio telephone in the satellite footprint over the satellite radio telephone frequency band using the wireless communications that are received by the ancillary terrestrial network from the second radio telephone in the satellite footprint over the satellite radio telephone frequency band.

Other wireless communications systems including a satellite gateway coupled to a communications network and operative to communicate with a communications satellite include a terrestrial terminal interface subsystem operative to communicate with a satellite gateway via the communications satellite using a first radio interface and to communicate with wireless terminals over a geographic area using a second radio interface, for example, as defined in U.S. Pat. No. 6,856,787.

Other cellular systems comprise a space based system including a first set of cells and a ground based system including a second set of cells. In such systems the space and ground systems can optionally function substantially autonomously with each using spectrum from at least one predetermined frequency band, for example, as described in U.S. Pat. No. 6,859,652.

All of the above recited systems are found to be expensive to fabricate, install and maintain, especially those employing satellite communications. Two such systems, Globalstar® and Iridium, each cost in the billions of dollars to develop, fabricate and launch and potentially hundreds of millions of dollars to maintain over their lifetimes. It is thus seen to be imperative to sustain the systems and make them commercially viable that every avenue be explored to generate revenue, including ATC systems and preferably methods and systems be developed and employed to enhance, improve and/or optimize the systems.

Consequently, prior art systems and methods to address intrasystem interference and reduction of same have been developed and employed.

In U.S. Pat. No. 5,875,180 a method is disclosed for operating a first satellite communication system of a type that operates co-frequency with at least one second transmission system such as a second satellite communication system. The method includes steps executed during the operation of the first satellite communication system, of measuring at least a plurality of locations within a coverage area of the first system an amount of interference resulting at least in part from the at least one second transmission system, the amount of interference being measured over a band of frequencies allocated to the first system; transmitting an indication of the measured interference from each location to a central site; and in accordance with the transmitted indications, assigning at least one user terminal to a sub-band of frequencies within the band of frequencies so as to reduce an amount of interference experienced by the user terminal.

In U.S. Pat. No. 5,905,943 there is disclosed a method for defining a radio frequency map to be used to isolate negative effects of undesirable radio frequency emitters on radio device communications handheld and stationary. The method includes the steps of measuring C-band power corresponding to an L-band beam as a part of an L-band footprint of a communication satellite, calculating various identifiable interference errors associated with the signal transmission path, and subtracting the interference errors from the original C-band power measurement resulting in a power value corresponding to undesirable radio frequency emitter interference at the location of the L-band beam. The resulting radio frequency map can then be used to reallocate frequency channels of operation used by radio devices, mobile phones for example, resulting in power savings in the radio device while maintaining a suitable signal to noise ratio.

In U.S. Pat. No. 6,879,829 there is disclosed a satellite communications system includes a satellite that is configured to wirelessly communicate with radioterminals in a satellite coverage area over a satellite frequency band, and an ancillary terrestrial component that is configured to wirelessly communicate with radioterminals in the satellite coverage area over at least some of the satellite frequency band, to thereby terrestrially reuse at least some of the satellite frequency band. Wireless communications with a radioterminal are handed over from the ancillary terrestrial component to the satellite if the radioterminal transmit power exceeds a threshold, and a received satellite signal quality exceeds a threshold, even though the radioterminal is able to wirelessly communicate with the ancillary terrestrial component. Downlink wireless radiation that is received at the radioterminal from a satellite may be monitored to determine potential interference created by the uplink radiation of the radioterminal due to the terrestrial reuse of at least some of the satellite frequency band.

OBJECTS OF THE INVENTION

There is therefore seen to be a continuing need to monitor interference in each channel of an MSS system including ancillary terrestrial component (ATC) services.

It is therefore an object of this invention to provide a communication system including a first transceiver, a first receiver and a first transmitter, a second transceiver including a second receiver and a second transmitter, that communicate with one another and provide for measurement of power at the gateway to determine which frequency channel within a band the first or the second transmitter is to operate.

It is therefore an object of this invention to provide methods and systems for handing over wireless communications in a satellite communications system.

A further object of this invention is to provide a satellite communications system which includes a satellite that is configured to wirelessly communicate with radio terminals in a satellite coverage area over a satellite frequency band and an ATC that is configured to wirelessly communicate with radio terminals in the satellite coverage area over at least some of the satellite frequency band to thereby terrestrially reuse at least some of the satellite frequency band while minimizing interference.

Still another object of this invention is to provide systems and methods which include a handover system of wireless communications with a radio terminal from the ATC to the satellite if the radio terminal transmit power exceeds a threshold and a received satellite signal quality exceeds a threshold.

Still another object of this invention is to provide a satellite communications system which includes a handover from the ATC to the satellite if the radio terminal transmit power exceeds a threshold.

Yet another object of this invention is to provide a satellite communications system wherein wireless communications with the radio terminal are handed over from the ATC to the satellite if the radio terminal power exceeds an aggregate radio terminal interference limit.

Yet another object of this invention is to provide a satellite communications system wherein wireless communications with the radio terminal are handed over from the ATC to the satellite if the radio terminal transmit power exceeds a threshold and the received satellite signal quality exceeds a threshold.

Yet again another object of this invention is to provide a satellite communications system wherein wireless communications with the radio terminal are handed over from the ATC to the satellite if the radio terminal transmit power exceeds a threshold, the received satellite signal quality exceeds a threshold and the radio terminal is a predetermined distance away from the ATC.

Yet again another object of this invention is to provide a satellite communications system where wireless communications with the radio terminal are handed over from the ATC to the satellite if the radio terminal transmit power exceeds a threshold, an aggregate radio terminal interference exceeds a limit, and the received signal quality exceeds a threshold independent of the position of the radio terminal relative to the ATC.

Another object of this invention is to provide a satellite communications system wherein the radio terminals are further configured to wirelessly communicate with a cellular/PCS base station in a cellular/PCS coverage area.

Yet again another object of this invention is to provide a satellite communications system wherein wireless communications with a radio terminal are handed over from the ATC to the cellular/PCS base station if the radio terminal transmit power exceeds a threshold, a received satellite signal quality is below a threshold, an aggregate radio terminal interference exceeds a limit and the radio terminal is at least a predetermined distance away from the ATC.

Still another object of this invention is to provide different frequency channels within each MSS provider's authorized ATC band wherein the number of ATC subscribers allocated to a given frequency in a combined MSS/ATC system are monitored to insure that the system does not attempt to overload the channel that is already experiencing self-interference.

Again another object of this invention is to provide a communications system including a first transceiver, a first receiver and a first transmitter, a second transceiver including a second receiver and a second transmitter, that communicate with one another and provide for measurement of signal to noise ratio at the gateway to determine which frequency channel within a band the first or the second transmitter is to operate.

Still another object of this invention is to provide a communications system including a first transceiver, a first receiver and a first transmitter, a second transceiver including a second receiver and a second transmitter, that communicate with one another and provide for measurement of power at the gateway over a control channel to determine which frequency channel within a band the first or the second transmitter is to operate.

BRIEF SUMMARY OF THE INVENTION

These and other objects of the instant invention are accomplished generally speaking by providing a communication system comprising at least a first transceiver, including at least a first receiver and a first transmitter, at least a second transceiver, including a second receiver and a second transmitter, which communicate one to the other wherein the at least second receiver provides power measurements over a frequency band from sources other than those monitoring downlink radiation received at a radio terminal from a satellite over a frequency band to determine which frequency channel within a band on which the first transmitter is to transmit. These power measurements may be transmitted over a control channel or other suitable means.

In a preferred embodiment, such a first receiver communicates with the second receiver and provides power measurements at the gateway over a frequency band which a controller in the second transceiver receives to determine which frequency channel within a band the first transceiver is to employ to transmit, and which frequency channel is transmitted from the second transmitter to the first transceiver.

In an alternative embodiment, signal to noise ratio may be measured in lieu of power to effect the frequency channel within a band that a transmitter is to be employed. In addition, the first transceiver may communicate with a plurality of second transceivers. Thus the first transceiver may be employed to measure the interference or the power from each transceiver in the second set of transceivers. Alternatively, the second transceiver may communicate with a plurality of a first set of transceivers, thus the second transceiver may be employed to measure the interference or the power from each transceiver in the first set of transceivers.

Another embodiment of the system of the instant invention may include the frequency being transmitted from transceiver 2 to transceiver 1 to determine frequency for transceiver 1 to transmit to transceiver 2.

In the process of rolling out the augmented terrestrial component or ATC services in different frequency channels within each mobile satellite systems providers authorized ATC band, the number of ATC subscribers allocated to a given frequency in a combined MSS/ATC system will require monitoring to insure that the system does not attempt to load more users onto a channel that is already experiencing self-interference due to a large number of ATC users. The system of the instant invention describes a method and system of monitoring interference in each channel by making measurements, for example, at the gateway of a bent-pipe satellite system and assigning new users to other frequencies in either the ATC or MSS mode. The monitoring method employed is premised on the fact that all signals in the ATC mode after attenuation due to various propagation and pointing losses are received at the satellite's reverse link uplink antenna, transponder down to feederlink frequencies and received at the gateway of the MSS system. By measuring the interference levels from sources other than those monitoring downlink radiation received at a radio terminal from a satellite or preferably at the gateway, it is possible for the system to determine which frequencies are more suitable than others, that is, will receive less interference than others, for assignment to new users in either ATC or MSS mode for a given beam. This would include both static and dynamic allocations of such frequencies.

When employing a bent-pipe repeater satellite system such as is used in the Globalstar® system, generally described in U.S. Pat. No. 6,272,325, the Globalstar® satellites have a repeating transponder which converts the return link uplink frequencies from user terminals at L-band into C-band downlink frequencies transmitted to the gateway. Since no onboard processing is employed in the Globalstar® satellite communication system, it is possible to obtain a sufficient spectral analysis of signals being transmitted in the L-band uplink, including an attenuated measure of the ATC signals that are being transmitted in the same frequency band by analyzing a spectrum analyzer at C-band frequencies at the gateway. The path losses and gains may be calibrated through a system during initial system testing to determine the level of uplink signal which appears at a given level as seen on a spectrum analyzer at the gateway receive chain, such as at the intermediate frequency used in the gateway. When the total level of signals received in a given frequency band at the satellite antenna at L-band exceeds a predetermined value, it is possible to observe that the gateway spectrum analyzer power level exceeds a certain threshold. In such a case, the gateway communicates with the network control center to ensure that no further users, ATC or MSS, are to use this channel, thus ensuring a high quality of service to ATC as well as MSS users. Preferably, in a multibeam system such as the Globalstar® system, it is possible for the gateway to identify from which beam the high interference originated and thus, on a geographical basis, to determine what frequencies should be allocated to ATC base stations in that area on the reverse link.

Any suitable transceiver may be employed in the communications system and method of the instant invention. Typical transceivers include transceivers comprising a receiver and a transmitter such as the one described in U.S. Pat. No. 5,303, 286. These suitable transceivers may be employed as either the first transceiver or the second transceiver in the system of the instant invention.

Any suitable receiver may be employed in the transceiver of the instant invention. Typical receivers include a satellite communications receiver, a wireless receiver or a wireline communications receiver.

Any suitable transmitter may be employed in the system and method of the instant invention. Typical transmitters include those used to transmit wireless or satellite or wireline communications.

Any suitable device that measures power may be employed in the system and method of the instant invention. Typical measuring devices include power meters, spectrum analyzers, network analyzers.

Any suitable satellite may be employed in the system and method of the instant invention. Typical satellites include LEO satellites, with or without onboard processing, MEO and GEO satellites, with or without onboard processing. These satellites can range from very low powered units, for example, bent pipe repeaters, up to and including very high powered satellites such as employed in GEO satellites.

Any suitable controller may be employed in the system and method of the instant invention. Typical controllers include a computer programmed to perform the necessary control, or processors programmed to perform the necessary control, or microcontrollers with firmware or hardware controlled by a program that can be used to control the pathway of a signal or data stream.

Any suitable power measurement transmission device may be employed in the system and method of the instant invention. Typical power measurement transmission devices include power meters, spectrum analyzers, network analyzers.

Any suitable controller that receives power measurements may be employed in the system and method of the instant invention. Typical controllers include a computer programmed to perform the necessary control, or processors programmed to perform the necessary control, or microcontrollers with firmware or hardware controlled by a program that can be used to control the pathway of a signal or data stream.

BRIEF DESCRIPTION OF THE DRAWINGS

The above set forth and other features of the invention are made more apparent in the ensuing Detailed Description of the Invention when read in conjunction with the attached drawings, wherein.

DETAILED DESCRIPTION OF THE EXEMPLARY EMBODIMENT(S)

The system of the instant invention, which is set out above in precise and accurate terms so as to enable one of ordinary skill in the art to practice same, will be better understood with reference to the following examples:

Example 1

Figure 4A:
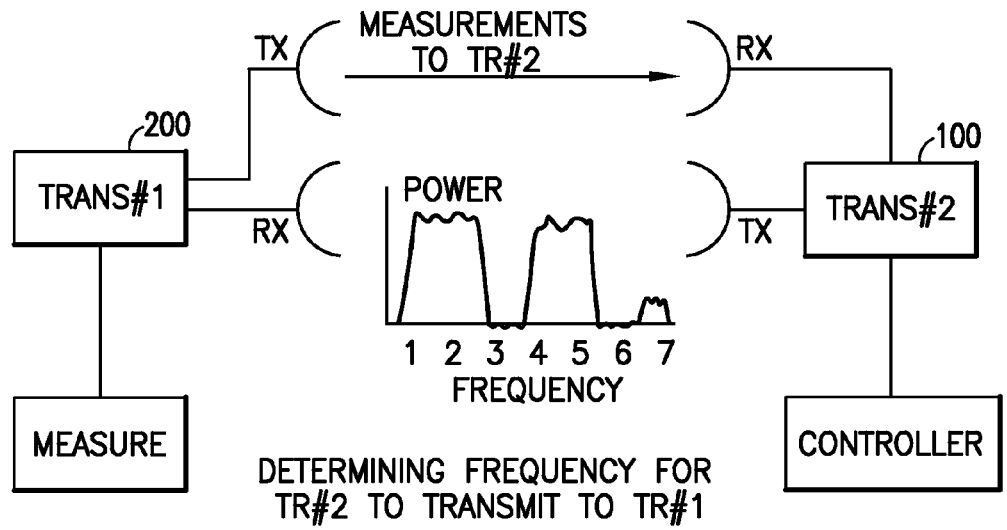
FIG. 4A illustrates a transmission frequency determined for transceiver 2 (100) for transmission to transceiver 1 (200).

An example application of FIG. 4A is one where transceiver 1 is at the gateway of a satellite system such as the Globalstar® system, and transceiver 2 in the figure is at the user terminal of an MSS user. Here the gateway transceiver measures, with a spectrum analyzer, the power levels in each frequency channel that it is receiving. These measurements, or a summary of these measurements, are then sent to the user terminal (transceiver 2) which then decides to transmit on a frequency that has the least interference power as reported by the gateway in its summary of measurements. In this way, the user terminal is able to transmit with low power since it is using a relatively clear channel to transmit on. When applied to multiple user terminals, this results in all these users from transmitting at the lowest power in the best channels; i.e., the ones with the least interference.

Example 2

Figure 4B:
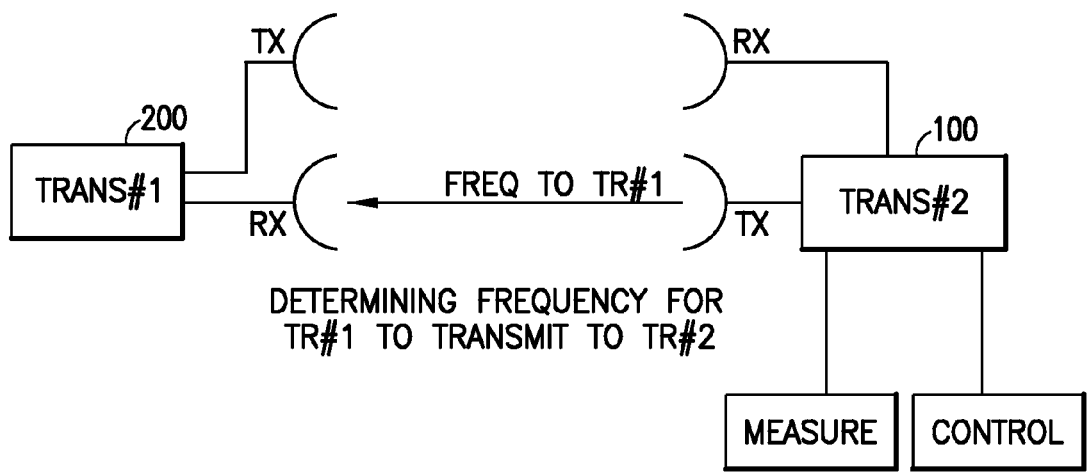
FIG. 4B illustrates the determination of a transmission frequency for transceiver 1 (200) for transmission to transceiver 2 (100).

Another application of FIG. 4, which is described in FIG. 4B, would be similar to Example 1, with the difference that in this case the gateway makes the decision itself on what frequency is best for the user terminal to transmit on and merely sends this information on a control channel to the user terminal.

Example 3

Another application of FIG. 4B is similar to Example 2 above in that the gateway measures power or signal-to-noise ratio or bit-error-rate in different frequency channels, decides that all frequency channels are running close to their capacity limit, and then directs the user terminal (transceiver 2) to go to the ATC component rather than the satellite component. In a system like Globalstar®, this is possible because the radiation in all frequencies, ATC or not, from user terminals in a satellite beam, are transmitted through the satellite and received at the gateway. Thus, the gateway is in a good position to look at all the interference presented from all sources (ATC as well as MSS) and determine which frequency, if any, is available for MSS and, if none is available, to direct the user terminal to switch to ATC mode. Likewise, when the gateway senses that any one of the channels becomes available due to some of its traffic being decreased, it can send a control message to the user terminal directing it to go from ATC mode to satellite (MSS) mode.

Figure 1:
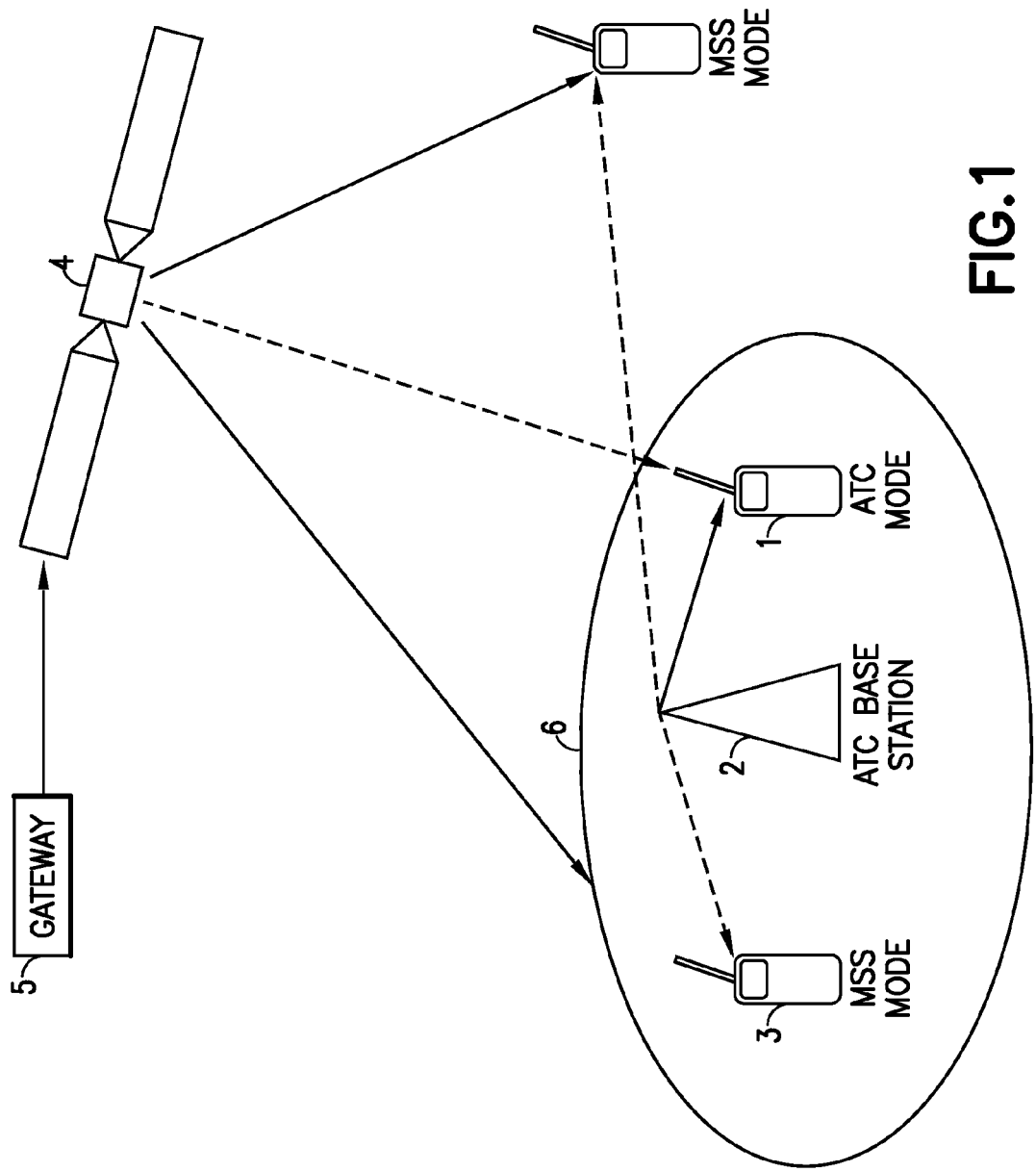
FIG. 1 illustrates an integrated MSS/ATC.

FIG. 1 shows an integrated MSS/ATC system conceptually. In this system, a user terminal can be operated in either ATC mode or MSS mode. In the Figure, user terminal (1) is shown as operating in ATC mode; i.e., communicating to and from an ATC base station (2). User terminal (3) is shown as operating in MSS mode. In this mode, the user terminal transmits to and receives from a gateway (5) via satellite (4). Satellite (4) may be a GEO satellite, or one of a constellation of GEO or MEO or LEO satellites. The ATC base station potentially interferes with the MSS downlink/uplink inside the ATC coverage area (6).

Figure 2:
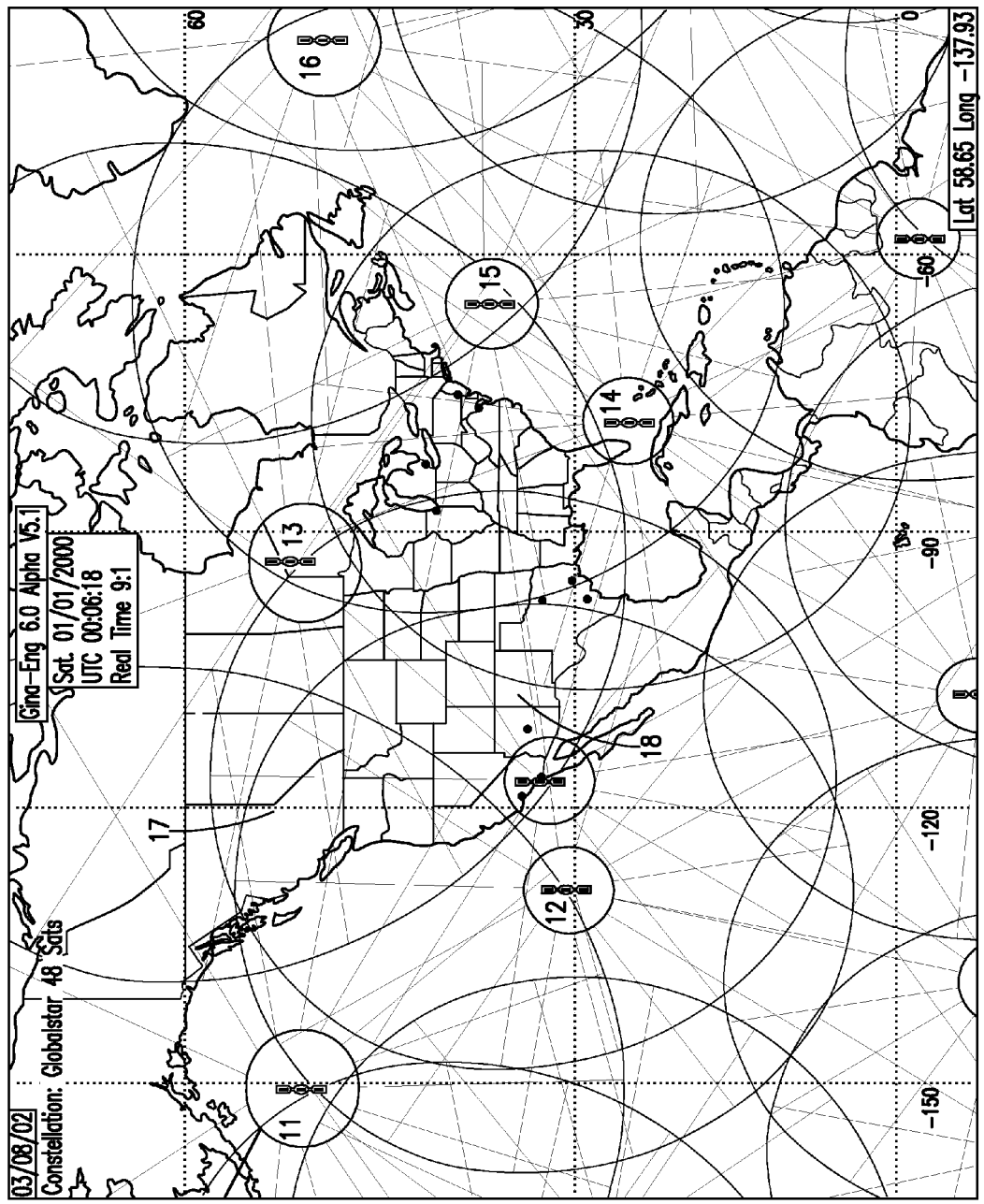
FIG. 2 illustrates an MSS/ATC system in a LEO constellation.

FIG. 2 shows an example of an MSS/ATC system that uses a LEO constellation of satellites, some of which are shown as (11), (12), (13), (14), (15), (16). In this figure, the darker shaded zones (e.g., zone 17) show normal full-spectrum MSS beams that are using all the MSS frequency channels available. The lighter shaded zones (e.g., zone 18) show regions where worst case ATC frequency interference causes impaired MSS service in frequencies used for ATC.

Figure 3:
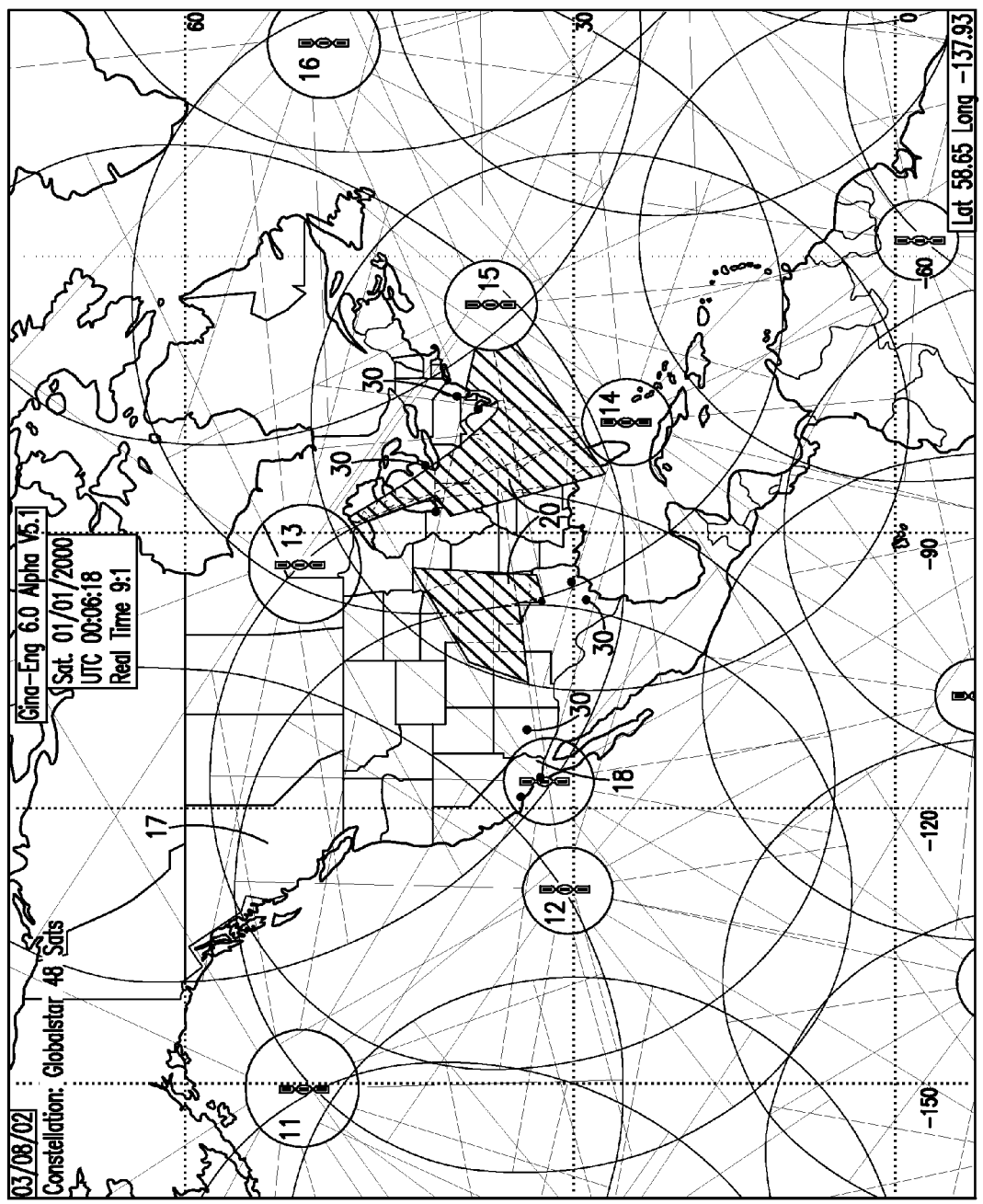
FIG. 3 illustrates improvement in MSS area.

FIG. 3 shows the same regions, but now with an improvement in MSS area by assigning two separate frequencies dynamically to MSS and ATC segments. In this figure, zones 20 use selected MSS frequencies via selected satellites. Separate ATC frequencies are designated by dotted zones 30.

FIG. 4A shows a transmission frequency determined for transceiver 2 (100) for transmission to transceiver 1 (200). In this case, receiver 1 makes measurements on the signal it receives in various frequency channels from transmitter 2 and sends these measurements to receiver 2 which decides what frequency is best (least interference) for transmitter 2 to transmit on.

FIG. 4B shows the determination of a transmission frequency for transceiver 1 (200) for transmission to transceiver 2 (100). Here receiver 2 makes measurements on the signal it receives in various frequency channels from transmitter 1, and uses these measurements to decide what frequency is best (least interference) for transmitter 1 to transmit on, and then sends this information about this best frequency to transceiver 1.

While the present invention has been particularly described with respect to certain components in its preferred embodiment, it will be understood that the invention is not limited to these particular components described in the preferred embodiments, or the sequence in employing or methods of processing the components. On the contrary, it is intended to cover all alternatives, modifications, and equivalents as may be included within the spirit and scope of the invention defined by the appended claims.

In addition, other components may be employed in the system of the instant invention as claimed as well as variations and alternatives to the components disclosed and claimed with similar results with regard to the operation and function of the system of the instant invention. In particular, the scope of the invention is intended to include, for example, GEO satellites equipped with dynamic beam forming which further enhances the performance of the system, or equipped with a Digital processing Router (DCR) or employing virtual gateway techniques as set out in U.S. Pat. No. 6,735,440, especially in FIGS. 15B-C.

The invention claimed is:

1. A method for frequency channel selection over wireless communications in a satellite communication system, the satellite communications system comprising at least a gateway and at least a first communications satellite, said satellite using a satellite frequency band, said satellite frequency band comprising a series of frequency channels, a radio terminal having a transceiver including at least a receiver and at least a transmitter, said transmitter capable of communicating through said gateway by way of the satellite using a portion of the satellite frequency band, said radio terminal selectively communicating via a wireless terrestrial link using a part of said portion of the satellite frequency band so as to terrestrially reuse that part of said portion of the satellite frequency band (the "reused frequency band");

the method comprising the steps of measuring a characteristic of each frequency channel in said portion of said satellite frequency band, received at said gateway, and selecting for said transmitter either a frequency channel in said reused frequency band or outside of said reused frequency band, where said selected frequency channel is selected based on said measured characteristic which comprises power, and said frequency channel selected is within said reused frequency band when said power in each frequency channel in said portion of said satellite frequency band that is outside said reused frequency band, exceeds a predetermined level.

2. A method for frequency channel selection over wireless communications in a satellite communication system, the satellite communications system comprising at least a gateway and at least a first communications satellite, said satellite communicates using a satellite frequency band, said satellite frequency band comprising a series of frequency channels, a radio terminal having a transceiver including at least a receiver and at least a transmitter, said transmitter capable of communicating through said gateway by way of the satellite using a portion of the satellite frequency band, said radio terminal selectively communicating via a wireless terrestrial link using a part of said portion of the satellite frequency band so as to terrestrially reuse that part of said portion of the satellite frequency band (the "reused frequency band");

the method comprising the steps of measuring a characteristic of each frequency channel in said portion of said satellite communication band received at said terminal, transmitting said measured characteristics to a controller associated with said gateway, said controller selecting for said transmitter either a frequency channel in said reused frequency band or outside of said reused frequency band, where said selected frequency channel is selected based on said measured characteristic which comprises power and said frequency channel selected is within said reused frequency band when said power in said portion of satellite frequency band that is outside said reused frequency band, exceeds a predetermined level.

3. A method for frequency channel selection over wireless communications in a satellite communication system, the satellite communications system comprising at least a gateway and at least a first communications satellite, said satellite using a satellite frequency band, said satellite frequency band comprising a series of frequency channels, a radio terminal having a transceiver including at least a receiver and at least a transmitter, said transmitter capable of communicating through said gateway by way of the satellite using a portion of the satellite frequency band, said radio terminal selectively communicating via a wireless terrestrial link using a part of said portion of the satellite frequency band so as to terrestrially reuse that part of said portion of the satellite frequency band (the "reused frequency band");

the method comprising the steps of measuring a characteristic of each frequency channel in said portion of said satellite frequency band, received at said gateway, and selecting for said transmitter either a frequency channel in said reused frequency band or outside of said reused frequency band, where said selected frequency channel is selected based on said measured characteristic which comprises power, and said frequency channel selected is outside said reused frequency band when said power in each frequency channel in said portion of said satellite frequency band that is within said reused frequency band exceeds a predetermined level.

4. The method of claim 3 wherein said characteristic is measured at said gateway.

5. The method of claim 3 wherein said measured characteristic is associated with return link uplink frequencies in said satellite frequency band.

6. The method of claim 3 wherein said communications system further includes a controller associated with said gateway and said selection is made by said controller.

7. The method of claim 3 wherein said selection is made at a location of said transceiver.

8. The method of claim 6 further including the step of transmitting said selected frequency channel to said transceiver through said gateway.

9. The method of claim 3 wherein said measured characteristic comprises power, and said frequency channel selected has the lowest power level of said frequency channels in said portion of said frequency band.

10. The method of claim 3 wherein said gateway communicates with a plurality of transceivers.

11. A method for frequency channel selection over wireless communications in a satellite communication system, the satellite communications system comprising at least a gateway and at least a first communications satellite, said satellite communicates using a satellite frequency band, said satellite frequency band comprising a series of frequency channels, a radio terminal having a transceiver including at least a receiver and at least a transmitter, said transmitter capable of communicating through said gateway by way of the satellite using a portion of the satellite frequency band, said radio terminal selectively communicating via a wireless terrestrial link using a part of said portion of the satellite frequency band so as to terrestrially reuse that part of said portion of the satellite frequency band (the "reused frequency band");

the method comprising the steps of measuring a characteristic of each frequency channel in said portion of said satellite communication band received at said terminal, transmitting said measured characteristics to a controller associated with said gateway, said controller selecting for said transmitter either a frequency channel in said reused frequency band or outside of said reused frequency band, where said selected frequency channel is selected based on said measured characteristic which comprises power, and said frequency channel selected is outside said reused frequency band when said power in said portion of satellite frequency band that is within said reused frequency band exceeds a predetermined level.

12. The method of claim 11 wherein said measured characteristic are associated with return link uplink frequencies in said satellite frequency band.

13. The method of claim 11 wherein said selection is made at a location of said transceiver.

14. The method of claim 11 wherein said measured characteristic comprises power, and said frequency channel selected has the lowest power level of said frequency channels in said portion of said frequency band.

15. The method of claim 11 wherein said gateway communicates with a plurality of transceivers.

* * * * *